US010913135B2

(12) United States Patent
Eralti et al.

(10) Patent No.: US 10,913,135 B2
(45) Date of Patent: Feb. 9, 2021

(54) MODULAR SEALING APPARATUS WITH FAILURE DETECTION UNIT

(71) Applicant: Endress+Hauser Wetzer GmbH+Co. KG, Nesselwang (DE)

(72) Inventors: Davide Eralti, Vedano al Lambro (IT); Massimo Del Bianco, Monza (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 233 days.

(21) Appl. No.: 15/745,406

(22) PCT Filed: Jun. 22, 2016

(86) PCT No.: PCT/EP2016/064369
§ 371 (c)(1),
(2) Date: Jan. 16, 2018

(87) PCT Pub. No.: WO2017/009013
PCT Pub. Date: Jan. 19, 2017

(65) Prior Publication Data
US 2018/0207757 A1    Jul. 26, 2018

(30) Foreign Application Priority Data
Jul. 16, 2015    (EP) .................................... 15177004

(51) Int. Cl.
*B23P 19/04*    (2006.01)
*G01D 3/08*    (2006.01)
(Continued)

(52) U.S. Cl.
CPC .............. *B23P 19/047* (2013.01); *G01D 3/08* (2013.01); *G01D 11/245* (2013.01); *G01M 3/26* (2013.01)

(58) Field of Classification Search
CPC ....... B23P 19/047; G01D 11/245; G01D 3/08; G01M 3/26
(Continued)

(56) References Cited

U.S. PATENT DOCUMENTS

| 2011/0005387 | A1* | 1/2011 | Ehre | ..................... F16F 9/0218 |
| | | | | 92/5 R |
| 2012/0272756 | A1 | 11/2012 | Pfauch et al. | |
| 2013/0152780 | A1* | 6/2013 | Bianco | ..................... F16J 15/00 |
| | | | | 92/165 R |

FOREIGN PATENT DOCUMENTS

| DE | 102011017535 A1 | 10/2012 |
| DE | 102011088736 A1 | 6/2013 |

(Continued)

OTHER PUBLICATIONS

Search Report for European Patent Application No. 15177004.7, European Patent Office, dated Jan. 8, 2016, 8 pp.
(Continued)

*Primary Examiner* — Tarun Sinha
(74) *Attorney, Agent, or Firm* — Christopher R. Powers; Endress+Hauser (USA) Holding Inc.

(57) ABSTRACT

The present disclosure relates to a kit for manufacturing a modular sealing apparatus for an installation assembly, a modular sealing apparatus comprising such kit and an installation assembly comprising such modular sealing apparatus. The kit comprises at least one piston, one bushing, and one sealing element, wherein the piston and the bushing are assembleable and accommodate the measuring insert by a bore provided in the piston and in the bushing, wherein the piston is interactively connected with the bushing such that a pressure transmitted by the piston to the bushing serves to deform the at least one sealing element to seal the bore extending through the piston and the bushing, wherein the kit comprises a failure detection unit with at least one
(Continued)

sensing element to detect at least one failure condition of the installation assembly, and an electronics embodied to convert the failure condition into a failure signal.

17 Claims, 4 Drawing Sheets

(51) Int. Cl.
    *G01D 11/24*     (2006.01)
    *G01M 3/26*     (2006.01)

(58) Field of Classification Search
    USPC .......................................... 73/866.5
    See application file for complete search history.

(56) References Cited

FOREIGN PATENT DOCUMENTS

| | | | |
|---|---|---|---|
| EP | 2343514 | A1 | 7/2011 |
| GB | 2427911 | A | 1/2007 |
| GB | 2427911 | B | 10/2009 |

OTHER PUBLICATIONS

Search Report for International Patent Application No. PCT/EP2016/064369, WIPO, dated Sep. 22, 2016, 11 pp.

* cited by examiner

MODULAR SEALING APPARATUS WITH FAILURE DETECTION UNIT

CROSS-REFERENCE TO RELATED APPLICATIONS

The present application is related to and claims the priority benefit of European Patent Application No. 15177004.7, filed on Jul. 16, 2015 and International Patent Application No. PCT/EP2016/064369 filed on Jun. 22, 2016, the entire contents of which are incorporated herein by reference.

TECHNICAL FIELD

The present invention relates to an installation assembly with sealing apparatus and failure detection unit, a sealing apparatus for an installation assembly and a kit for manufacturing such sealing apparatus.

BACKGROUND

In many hazardous material- and high power applications, it is necessary to use installation assemblies, in order to observe and/or to monitor conditions in a process. In such case, it is important that all necessary safety precautions, especially as regards sealing from the process environment, be taken into consideration.

Known from the European patent application EP 2343514 A1 is an installation assembly for a rod-shaped measuring insert, wherein, for accommodating a measuring insert, a first safety chamber is provided in a first housing part and a second safety chamber in a second housing part, wherein the first housing part has a process connection and wherein the first housing part is connected to the second housing part on a side of the first housing part lying opposite the side with the process connection, and wherein a sealing apparatus is provided, which serves, in the case of measuring insert introduced into the assembly housing, to seal, especially relative to pressure- and/or to liquid, the second safety chamber relative to the first safety chamber. The sealing apparatus proposed there is, however, in given cases, irreversible, due to the proposed application of a graphite bushing. Additionally, the sealing apparatus proposed there must be manually operated, in order to achieve the sealing action.

A self-sealing sealing apparatus, as well as a kit for manufacturing such sealing apparatus and the according installation assembly, serving for accommodating a measuring insert, are described within the German patent application DE102011088736A1. The sealing apparatus at least comprises a piston, a bushing and at least one sealing element. The piston and the bushing serve to accommodate the measuring insert by a bore provided in the piston and in the bushing. Additionally, the piston is connected interactively with the bushing in such a manner that a pressure transmitted by the piston to the bushing serves to deform the sealing element, which is preferably arranged on at least one end of the bushing, and thereby to achieve a sealing action, in order, in the case of introduced measuring insert, to seal the bore extending through the piston and the bushing, especially liquid or gas tightly. Such sealing apparatus may be arranged, for example, between a process connection of a container, in which a medium is located, and a housing being part of the installation assembly provided for connection with the process connection.

The sealing mechanism established that way is automatically driven by a pressure difference between two sides of the apparatus, which are on the one hand the process side and on the other an external access side. Once the sealing mechanism is initiated, it may be desirable, that at least one staff member is notified on this event in due time in order to be able to react on the incidence of the pressure change, to check its origin and/or eventually perform some maintenance action.

SUMMARY

It is thus an object of the present invention to provide a simple self-sealing sealing apparatus that makes a notification of an actual sealing event possible.

This object is achieved by a kit, a sealing apparatus and an installation assembly.

With regards to the kit, the object is achieved by a kit for manufacturing a modular sealing apparatus for an installation assembly, which installation assembly serves for accommodating a measuring insert, wherein the kit comprises at least one piston, one bushing, and one sealing element, wherein the piston and the bushing are manufactured such that they are assemblable and serve to accommodate the measuring insert by a bore provided in the piston and in the bushing, wherein the piston, when assembled with the bushing, is interactively connected with the bushing such that a pressure transmitted by the piston to the bushing serves to deform the at least one sealing element, which is preferably arrangeable on at least one end of the bushing, and thereby, in the case of introduced measuring insert, to achieve a sealing action in order to seal the bore extending through the piston and the bushing, and wherein the kit comprises a failure detection unit with at least one sensing element, which serves to detect at least one failure condition of the installation assembly, and an electronics embodied such that it converts the at least one failure condition into a failure signal and forwards the failure signal towards a monitoring element and/or towards a plant control system and/or creates an alarm.

By means of such kit, existing installation assemblies can be retrofitted with a self-sealing sealing apparatus. In this regard, a sealing apparatus formed from the kit can be arranged, for example, between a process connection of a container, in which a medium is located, and a housing part of the installation assembly provided for connection with the process connection. Appropriate materials may be chosen for the at least on sealing element to ensure the sealing mechanism for the actual process. Sealing may be achieved for liquid as well as gaseous media, e. g. hydrogen or helium.

The failure detection unit is embodied such, that it detects at least one failure condition of the installation assembly. It may e.g. detect the initiation of a sealing event or any action associated therewith. By means of an electronics an associated failure signal may be produced being representative for the respective failure condition. The failure signal may be either forwarded towards a monitoring element which may be any display, a warning light such as e. g. a LED or an acoustic transducer like e.g. a buzzer. On the other hand, the failure signal may be forwarded towards a plant control system and processed and/or displayed therein. Also, an alarm may be created either via the monitoring unit or via the plant control system.

By means of integrating the failure detection unit into the kit, an initiated sealing mechanism of the sealing apparatus becomes automatically detectable. A staff member or other may be notified on an event either by the monitoring element, the plant control system and/or an alarm and be enabled to react on the respective incidence. In the case, the failure signal is forwarded to the plant control system e.g. the integrity of the associated installation assembly with respect to the sealing may be checked automatically, e. g. by means of a remote position, without the necessity of periodical inspections at the device itself.

In one embodiment of the kit, the kit comprises at least two bushings and at least one spring, wherein the bushings and the spring are essentially aligned along an imaginary axial, e. g. horizontal, line, and wherein the spring is placed between the two bushings.

In this case, the sealing mechanism involves transmission of a pressure from the piston to at least one of the at least two bushings and consequently a deformation of the at least one sealing element preferably located at an end of a second of the at least two bushings. The spring between the at least two bushings thereby serves for a pre-compression of the sealing apparatus. Hence, in case the sealing apparatus stays in its rest position, meaning that no pressure is transferred via the piston, the components are aligned by means of the spring with an initial tension. The spring thereby further increases the distance which the piston may move in case a pressure is transmitted towards it. In case a sealing mechanism is initiated, wherein the piston performs its pushing function a higher stroke or force may be transmitted towards the sealing element increasing its squeezing load and hence, the sealing effect. If there is no more pressure transmitted via the piston the spring finally increases the restoring force of the bushings which are meant to push pack the piston into its rest position.

According to one embodiment of the kit, the at least one failure signal is an electrical signal, a visual and/or an acoustic signal. Thereby, either one failure signal may be generated, or also at least two different failure signals may be provided relating either to the same or to different failure condition. In particular, an electrical signal may be forwarded to a plant control system. In contrast a visual and/or acoustic signal may be transferred towards the monitoring element and/or may also be detected during a routine inspection on site. In case, that more than one failure signal is generated, e.g. an electrical as well as a visual and/or acoustic signal may be produced and used for notification of the initiation of a sealing mechanism, in particular, if the failure detection unit comprises a monitoring element and means for forwarding a signal towards a plant control system.

In one embodiment of the kit, the failure detection unit is embodied such that the sensing element is capable of detecting a movement and/or a change of the geometrical location of the piston. Thus, the at least one failure condition is given by the movement and/or change of the geometrical location of the piston condition indicating the initiation of a sealing mechanism.

In one embodiment of the kit, the sensing element comprises a mechanical sensor. A mechanical sensor is a sensor able to detect a certain mechanical quantity, such as for instance an approach or removal of an object, a force, or a pressure.

In this context it is advantageous, if the sensing element comprises the sensing element comprises a mechanical micro-switch, which is positioned in direct mechanical contact with a surface of the piston oriented perpendicular to its moving direction, which is activated by a translational sliding of the surface of the piston. Alternatively, the sensing element may comprise a pivoted sphere, which is positioned in direct mechanical contact with a surface of the piston oriented perpendicular to its moving direction, and a mechanical micro-switch, which is activated by a rotation or translation of the sphere. The movement of the piston and/or the change in its geometrical location is hence detected based on a mechanical movement, such as a translational sliding of the surface of the piston being in direct mechanical contact with the mechanical micro-switch or by a rotation or translation of a sphere.

In another embodiment of the kit, the sensing element comprises an inductive sensor, which is positioned such that it faces at least intermittently a surface of the piston oriented parallel to its moving direction, and wherein the piston consists of an electrically conductive material. As indicated by the name, an inductive sensor, frequently also called proximity sensor, makes use of the principle of electromagnetic induction and for instance serves for contactless measurements of paths and angles. Its sensing element means for generating a magnetic field, e. g. an oscillation circuit with at least one coil and e. g. a capacitor, in which an electrically conductive object may move, e. g. the piston. Movement of the electrically conductive object, e. g. the piston then evokes eddy currents resulting e. g. in a change of amplitude within the oscillation circuit.

Yet in another embodiment of the kit, the sensing element comprises a capacitive sensor, which is positioned such, that it faces a surface of the piston oriented parallel to its moving direction, and wherein the piston consists of an electrically conductive material. A capacitive sensor may e. g. serve as pressure sensor or distance sensor. Principally, a change in the capacitance of a single or a multitude of capacitors is detected, whereas e. g. one of at least two electrodes of the capacitor or at least one electrode of one of the multitude of capacitors is given by at least on surface of an object to be measured, e. g. the piston. This capacitance change in turn may be induced e. g. by a displacement, a movement, a change in the geometrical location or also by a deformation of said object, e.g. the piston.

According to another embodiment of the kit, the sensing element comprises a magnetic sensor, which is positioned such that it faces at least intermittently a surface of the piston oriented parallel to its moving direction, and wherein the piston at least partially consists of a magnetic material. Many different types of sensors may subsumed under the term magnetic sensor, e. g. hall sensors, magnetic field sensors, so called Wiegand sensors relying on the Wiegand effect, magnetic dependent resistors, but also sensors relying on effects such as the anisotropic magnetoresistive effect, the giant magnetoresistive effect, the colossal magnetoresistance or the tunnel magnetoresistance. Commonly, the sensing principle relies on the effect of a magnetic field on a certain magnetic material. For instance, by providing a piston at least partially composed by a magnetic, preferably ferromagnetic, material, its movement and/or change of geometric location results in a change of the associated magnetic field which may be detected by a suitable sensing element.

In one embodiment of the kit, the sensing element comprises an optical sensor, which is positioned such that it faces at least intermittently a surface of the piston oriented parallel to its moving direction. The sensing element may comprise an optical element which is capable of detecting a movement and/or change in the geometrical location of the piston. For instance, at least the surface of the piston facing the sensing element may be divided into at least two sub-regions which may be coated of two different materials featuring different reflectivities.

With respect to possible failure conditions in one embodiment of the kit, the failure detection unit is arranged and/or designed such that it is capable of detecting a change of pressure in at least a closed portion of the installation assembly. Such change of pressure will eventually lead to a movement of the piston and thus initiating a sealing mechanism.

In this regards it may be advantageous to define a certain threshold for the pressure. Only, if the pressure change exceeds the threshold, it is assigned towards the initiation of a sealing mechanism.

In this regards it is as well advantageous, if the sensing element comprises a pressure sensor or a pressure switch. With regards to application of the kit as sealing apparatus for an installation assembly, the pressure sensor may be arranged on the process side.

With regards to the modular sealing apparatus for an installation assembly, which installation assembly serves for accommodating a measuring insert, the object of the present invention is achieved by a modular sealing apparatus comprising at least a kit according to at least one of the aforementioned forms, wherein the piston and the bushing are interactively connected, and wherein the kit is arranged such as to seal the bore especially liquid or gas tightly. The bore is provided in the piston and bushing and serves for accommodating the measuring insert. In a form of embodiment of the sealing apparatus, the at least one sealing element is arranged, or arrangeable, coaxially around the measuring insert. Preferably, the at least one sealing element is an O-ring.

The at least one sealing element may be composed, in such case, preferably of an elastic material, so that the at least one measuring insert, in the case, in which the piston is not loaded with pressure, can be drawn through the bore and the sealing element, in order, for example, to replace the at least one measuring insert.

As regards the installation assembly, the object of the present invention is achieved by an installation assembly with a modular sealing apparatus according to at least one of the aforementioned forms, wherein the installation assembly has a first housing part, which is connectable to a process connection, wherein, on the side of the first housing part facing the process connection, the sealing apparatus is insertable into a recess or opening of the first housing part. The sealing apparatus may be integrated into a process connection or into a flange, such as, for example, the first housing part, or between the first housing part and the process connection.

The proposed sealing apparatus for an installation assembly can improve reliability and replacement of measuring transducers in a plant. Since, for example, the duration of operation between inspections can be increased, costs can be saved. Furthermore, the proposed sealing apparatus can be applied as a retrofit to known sealing apparatuses, so that an additional sealing stage is obtained and finally, it may be e. g. also applied, especially when a number of measuring inserts are present, in order to determine a temperature curve, or a temperature profile, in a container.

An idea of the invention is to provide an automatic sealing mechanism including a failure detection unit, which utilizes a pressure difference between medium present in the process and the environment of the process. As a result, the proposed invention is independent of secondary leakage indicators, since it responds to the leakage itself.

In a form of embodiment of the installation assembly, the recess in the first housing part has a floor, wherein on the floor of the recess likewise at least one bore is provided, which serves for accommodating the at least one measuring insert. Furthermore, an additional housing part of the installation assembly can be located on the first housing part and, indeed, on the side of the first housing part facing away from the process/process connection. This additional housing part can include, for example, a measuring- and/or operating electronics and/or connection terminals, via which the at least one measuring insert is electrically contactable. Furthermore, between the first housing part and the additional housing part, a safety chamber can be arranged, such as provided, for example, in EP 2343514 A1.

The bore in the floor of the recess of the first housing part has a first section with a first diameter and a second section with a second diameter, wherein the first diameter is larger than the second diameter, wherein the first section of the bore adjoins the floor, and wherein the second section adjoins the first section.

The transition of the first section to the second section may occur via a shoulder facing the floor of the recess of the first housing part. For example, the sealing element can be located on this shoulder, for example, a sealing element in the form of an O-ring. The bushing in turn may be introduced into the first section of the bore in the first housing part, wherein the shoulder serves as a stop for the bushing. Thereby, the at least one sealing element may be arranged between the stop and the bushing.

The bore in the piston may have a first and a second section with a first and, respectively, a second diameter, wherein the first diameter is greater than the second diameter, and wherein the transition between the first section and the second section occurs by means of a shoulder, which serves as a stop for the bushing insertable into the first section. The at least one sealing element may as well be arranged between the stop and the bushing in the bore of the piston.

The installation assembly may include a second housing part, which adjoins the first housing part on the side of the first housing part facing away from the process connection, and the second housing part may have an operating electronics and/or connections for connecting the at least one measuring insert to electrical connection lines.

According to one embodiment of the installation assembly, the process connection has at least one bore, through which the at least one measuring insert is introducible, preferably in a protective tube. The protective tube may e. g. be a thermowell.

In one embodiment, the installation assembly, especially the modular sealing apparatus of the installation assembly, is so designed, preferably is so matched to a running process and its pressure difference relative to an ambient pressure that, in the case of leakage of the protective tube, a pressure present in the protective tube and the bore provides that the bushing is pressed via the piston against the at least one sealing element, in order to achieve the sealing action.

In another embodiment of the installation assembly, in the floor of the recess or opening of the first housing part, in the piston and in the process connection, there are provided a plurality of essentially mutually parallel bores, each of which serves for accommodating a measuring insert, and wherein each of these bores has at least one sealing element and a bushing, which serve to seal the bore, especially in the case of leakage.

The bores may be arranged, preferably equidistantly, on a circle coaxially to a longitudinal axis of the installation assembly. The bores and/or the measuring inserts may furthermore have different lengths.

According to one embodiment of the installation assembly, there is arranged on an end of a measuring insert at least one measuring transducer, which serves for ascertaining a chemical and/or physical variable, preferably temperature.

In one embodiment of the installation assembly, a connection port is provided in at least a closed portion of the installation assembly, e. g. on the process side of the installation assembly, e. g. the first housing part. Via the connection port the at least one closed portion of the installation assembly may be pressurized on purpose in order to perform a maintenance operation. This enables to perform a periodical check of the safety system given by the modular sealing apparatus and of the correct working of the failure detection unit. In order to pressurize the first housing part, the connection port may be, for instance, connected towards a purge line.

BRIEF DESCRIPTION OF THE DRAWINGS

The invention will further be explained on the basis of the following figures, whereas:

FIG. 1 shows a schematic representation of a modular sealing apparatus integrated into an installation assembly in longitudinal cross section (a) in the starting position, i.e. without pressure loading, and (b), in the compressed, i.e. pressure loaded, position;

FIG. 3 shows a modular sealing apparatus with a failure detection unit in the form of (a) a mechanical sensor, and (b) an inductive sensor;

DETAILED DESCRIPTION

FIG. 1 shows a schematic representation of a modular sealing apparatus 1, which is integrated in an installation assembly 2 according to the state of the art described in DE102011088736A1. The installation assembly 2 is secured to a process connection 3, such as a mount on a container, e.g. a tank or a pipe, to which process connection 3 the first housing part 4 is connected. Preferably, the first housing part 4 is embodied such, that it fits accurately against the process connection 3, such so that the transition between the process connection 3 and the first housing part 4 occurs essentially without any offset between the two components 3, 4, but, instead, that the two components 3, 4 can be oriented accurately fit and preferably in alignment relative to one another. Additionally, on the abutment surface A between the first housing part 4 and the process connection 3, a seal 5, e.g. an O-ring, can be placed in a recess in the process connection 3.

The installation assembly 2 additionally includes at least one bore 6 (for the present example two bores), which serve for accommodating at least one measuring insert 7 (for the present example two measuring inserts). The at least one measuring insert 7 serves for registering a measured variable, such as temperature, and has an essentially elongated, rod shape. The at least one measuring insert 7 is led through the at least one bore 6 through the first housing part 4, the modular sealing apparatus 1 and the process connection 3.

On the side of the installation assembly 2 facing the process the process connection may lead into a protective tube (not shown) like e.g. a thermowell, which protrudes inwardly into the process and protects the at least one measuring insert 7 from the medium.

Additionally, the first housing part 4 has a recess or opening 8, which faces the process connection 3 and serves for accommodating the sealing apparatus 2. The recess or opening 8 is preferably basically a blind hole, in whose floor the at least one bore 6 is located. In the readily installed configuration, the at least one bore 6 extends through the process connection 4 opening into the recess or opening 8 of the first housing part 4. The opening or recess 8 serves as an essentially exactly fitting for the piston 9.

The recess or opening 4 of the first housing part 8e serves, in such case, for the essentially exactly fitting accommodation of a piston 9. The piston 9 features at least one bore. Preferably, it features the same amount of bores 6 compared to those proceeding through the process connection 4 and being located such that the at least one measuring insert 7 may be introduced, and, respectively, arranged, through them essentially parallel to one another and extending in straight lines. The recess or opening 8 may be essentially cylindrical and serve for accommodating a likewise essentially cylindrical piston 9. Along its lateral surface, the piston 9 can have one or a plurality of grooves (not shown), which serve for accommodating seals 10, such as, for example, sealing rings. The top and bottom of the piston 9 can be chamfered at the edges. In the hollow space created between the piston 9 and the first housing part 4 by this chamfering, a sealing element 10, preferably likewise in the form of an O-ring, can be arranged. Through these precautionary measures, the piston 9 is sealed against the recess or opening 8 of the first housing part 4. In spite of these measures, the piston 9 can remain movable in the recess or housing 8 of the first housing part 4, in particular, it can shift its position by moving in the recess or opening 5 along the direction of the longitudinal axis L of the installation assembly 2.

The at least one bore 6 extending through the piston 9 may have a first diameter in a first section, which is larger than a second diameter within a second section of the at least one bore 6. In such case, the first section serves for accommodating at least one bushing 11 which resides, on the one hand, in the piston 9 and, on the other hand, in a first section of the at least one bore 6 in the first housing part 4, wherein this first section of the at least one bore 6 in the first housing part 4 has a first diameter, which is larger than a second diameter of the at least one bore 6. In such case, the first section of the at least one bore 6 transitions into the second section of the at least one bore 6 via a shoulder both in the piston 9 as well as also in the first housing part 4. These shoulders serve as stops for the at least one bushing 11. When the at least one bushing 11 is in the at least one bore 6, at least one sealing element 12, preferably in the form of an O-ring, is arranged between the at least one bushing 11 and the stop between the first and the second section of the at least one bore 6.

If, now, there is, for example, a leakage of the installation assembly 2, or the protective tube (not shown) or the process connection 3, then there often arises, as well, also a pressure difference between the process and the process environment. This pressure moves the piston 9 in the direction of the longitudinal axis L of the installation assembly 2. Because of the presence of the at least one bushing 11, the at least one sealing element 12 is deformed, so that the at least one bore 6, into which the at least one measuring insert 7 is brought, becomes sealed.

In this way, an automatically acting modular sealing apparatus 1 is created, which, in the case of leakage, seals the at least one bore 6, serving to accommodate the at least one measuring insert 7.

In case of more than one bore 6, it is advantageous, if the bores 6 are distributed equidistantly along a circular path around the center defined by the longitudinal axis L in order to obtain an optimal force transition. The radius of the circular path thereby may increase with the number of bores 6 provided, whereas the maximum number of bores 6 depends on the diameter of the piston 9 as well.

Figure 1A:
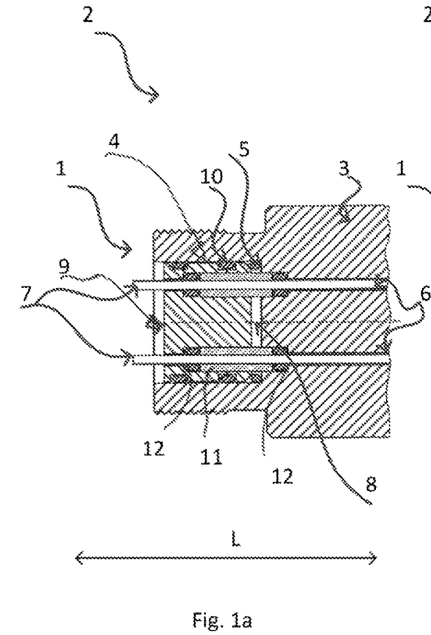
Figure 1B:
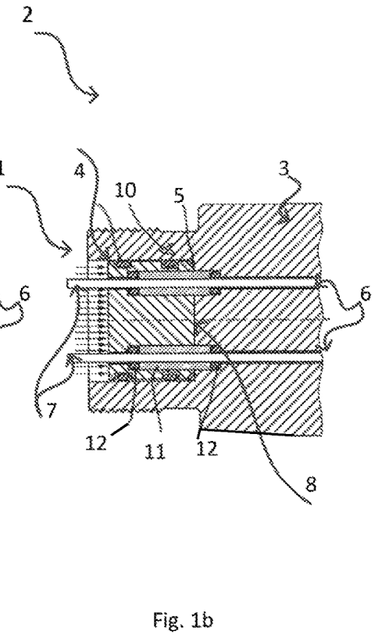

While for the representation according to FIG. 1a) the modular sealing apparatus 2 is in its rest, or starting position, FIG. 1b) shows the same set up, but with the modular sealing apparatus 2 anticipating the pressure loaded position. The pressure exerted on the piston by the medium or the process is indicated by the arrows, leading to a deformation of the at least one sealing element 12 such, that it exerts a sealing action with the effect, that medium cannot escape through the at least one bore 6, into which the at least one measuring insert 7 is inserted. Likewise, the seal 10 placed between the chamfer (which bounds the top of the piston 9) and the recess or opening 5 in the first housing part 4 becomes deformed as well, so that the medium in the case of a leakage also cannot escape between the piston 9 and the wall of the recess or opening 5.

Figure 2:
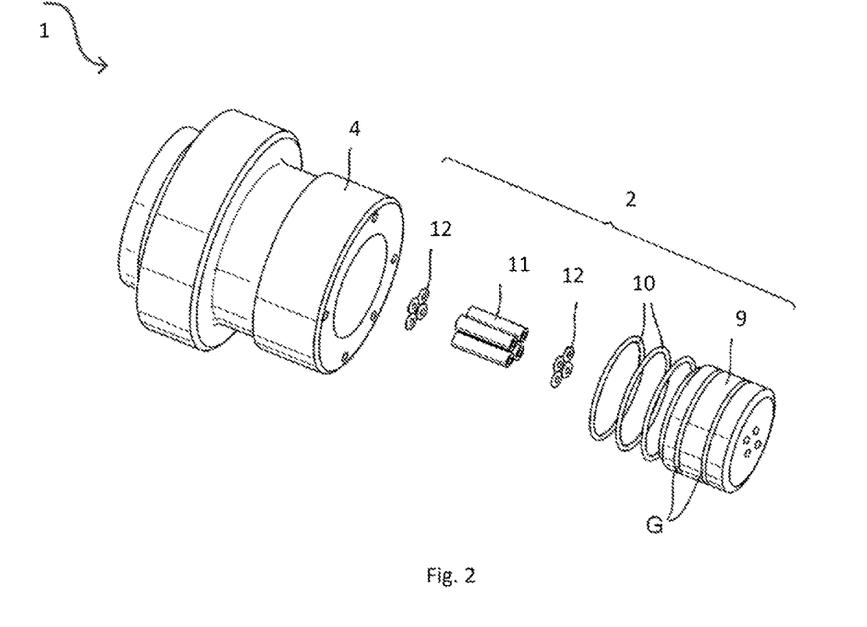
FIG. 2 shows a exploded view of a sealing apparatus and a first housing part of an installation assembly.

A more detailed view of the modular sealing apparatus 1 as assembled from the kit, and respectively, being composed of a set of components, together with the first housing part 4 is shown in FIG. 2. The first housing part 4 is connectable to a process connection 3 (not shown). The kit, in this example, is composed of a first set of sealing rings 12, a set of bushings 11, a second set of sealing rings 12, a piston 9 and a third set of sealing rings 10. The first and the second sets of sealing rings 12 are arranged on the ends of the corresponding bushings 11, while the third set of sealing rings 10 is placed around the lateral surface of the piston 9. For this purpose, the piston 9 may have corresponding grooves (not shown) to hold the sealing rings 10.

The sealing mechanism established by that modular sealing apparatus is automatically driven by a pressure exerted by the medium or process. However, in order to make it possible to notify at least one staff member or other on any initiation of such sealing mechanism, or of its correct working, according to the present invention a failure detection unit 13 is integrated into the kit. The failure detection unit 13 comprises a sensing element 14 and an electronics 15. Different principles underlying the detection of the at least one failure condition may be employed, whereas three examples will be given by the embodiments described in the following. Thereby, components and reference characters which were already explained will not again be mentioned in detail.

Figure 3A:
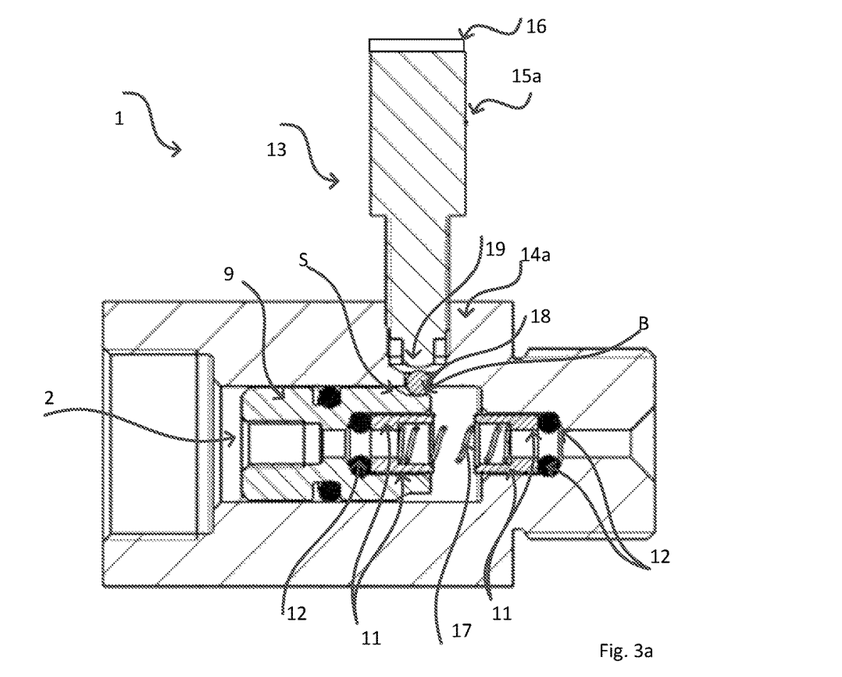

In FIG. 3a) a modular sealing apparatus 2 with a failure detection unit 13 based on a sensing element in the form of a mechanical sensor 14a is shown. The electronics 15a includes a monitoring element 16 may be any display, a warning light such as e. g. a LED or an acoustic transducer like e.g. a buzzer. Additionally, the electronics 15a may be embodied such, that it can forward a failure signal representing the at least one failure condition towards a plant control system (not shown) and/or creates an alarm.

The modular sealing apparatus 2 in this example comprises four bushings 11 arranged in two pairs of two opposing bushings 11 each, and a spring 17, all of them being essentially aligned along an axial line. Note, that the minimum amount of bushings 11 for this embodiment generally equals two, but that any number larger than two may be employed as well. The spring 17 serves for a pre-compression of the modular sealing apparatus 2 and an initial tension while remaining in the rest position, meaning that the sealing assembly 2 is not pressure loaded. The spring 17 further increases the distance the piston 9 may move upon pressurization and hence to a higher stroke or force exerted towards the at least one sealing element 12.

The mechanical sensor 14a is designed for detecting the at least one failure condition, here given by a movement or change of geometrical location of the piston 9. It comprises a pivoted sphere 18, which is positioned in direct mechanical contact with a surface B of the piston 9 oriented parallel to the longitudinal axis L and to the moving direction of the piston, and a mechanical micro-switch 19. A movement or change of geometrical location of the piston 9 due to a pressure exerted towards it causes a rotation and/or translation of the sphere 18. This rotation and/or translation of the sphere activates the micro-switch 19 and is indicative for the initiation of the sealing mechanism.

Note, that the mechanical sensor might as well be positioned in direct mechanical contact with the surface B of the piston 9, without an additional pivoted sphere 18. The sphere 18 in general serves for a reduced friction between the piston 9 and the mechanical micro-switch, which e. g. might comprise a second piston (not shown). In case, no pivoted sphere 18 is integrated, the mechanical micro-switch is e. g. activated by a translational sliding of the surface B of the piston 9. However, in that case it may be advantageous to modify the surface B of the piston 9 such that it allows for a proper translational sliding, e. g. by a certain polishing or also other surface treatment.

In general for the case of a mechanical sensor, the dimensions as well as the material of the piston 9 need to be chosen in accordance with the sensing element 14a, 14b employed. In case of a mechanical sensor 14a as in FIG. 3a) the pivoted sphere 18 needs to touch the chosen surface of the piston B during its entire stroke length. This means that at least a detail of surface B of the piston 9 needs to face the mechanical sensor 14a both, while the piston 9 is in its rest position and while it is in the pressure loaded position. For moving the sphere 18 during the pressure induced movement, surface B may e. g. include a shoulder.

Figure 3B:
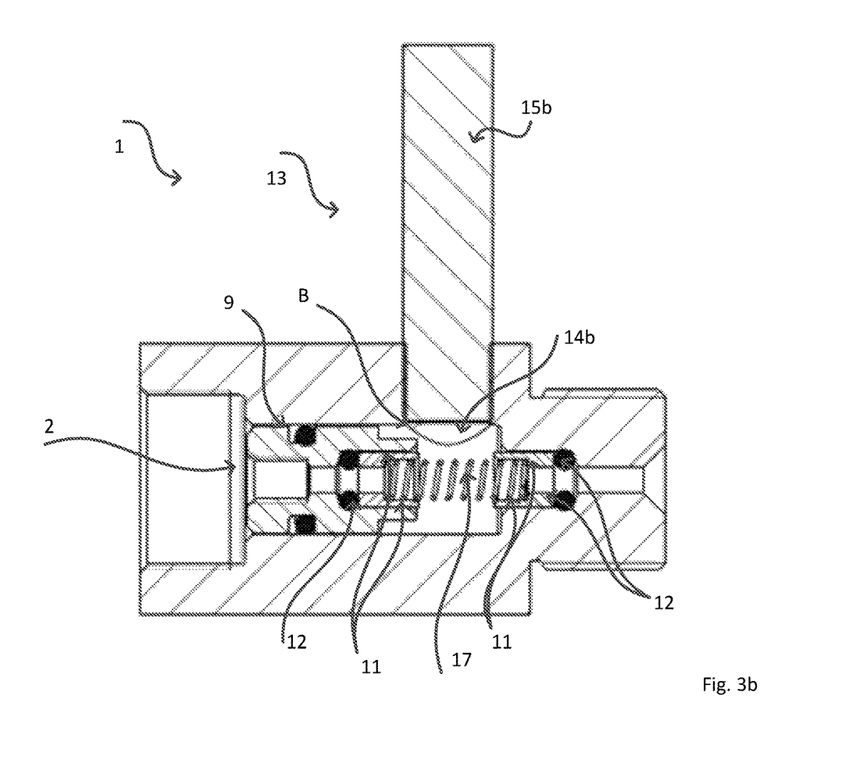

In contrast, for a failure detection unit with a sensing element in the form of an inductive sensor 14b as employed in FIG. 3b), the length of the piston 9 parallel to the longitudinal axis L may also be shorter. The inductive sensor 14b comprises means (not shown) for generating an electromagnetic field, e. g. an oscillation circuit with at least a coil and a capacitor. For the example shown, the field may be such that it propagates perpendicular to the moving direction of the piston 9 and such that it penetrates through the modular sealing apparatus 2. Thus, the piston 9 moves in the electromagnetic field and due to changing its geometrical location evokes eddy currents resulting e. g. in a change of amplitude within the oscillation circuit. The piston 9 must therefore be manufactured by an electrically conductive material. With respect to its dimensions it can be either constructed such that it resides outside the electromagnetic field while being in its rest position as shown in the embodiment according to FIG. 3b). In this case, the change in electromagnetic inductance is achieved by moving 9 into the electromagnetic field. Alternatively, the surface B of the piston 9 may be such that it comprises parts of different material, so that a movement of the piston 9 causes different surface parts to be exposed towards the electromagnetic field also resulting in a change of inductance.

Since the embodiments according to FIGS. 3a) and 3b) only differ with respect to the failure detection unit 14a, 14b other reference characters will not be explained again here. By way of example, sensing elements in the form of capacitive, optical or magnetic sensors are possible as well whereas similar considerations apply for the material and dimension of the piston 9 utilized in combination with such sensing elements.

Figure 4:
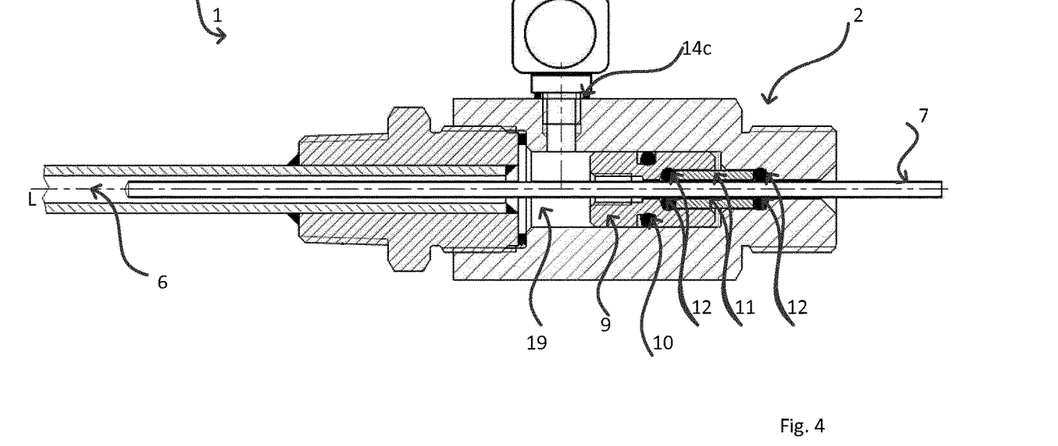
FIG. 4 shows a modular sealing apparatus with a failure detection unit comprising a pressure gauge.

Besides a movement and/or change of geometrical location of the piston 9 the failure detection unit 13 may also be embodied such that it detects a change of pressure in at least a closed portion 19 of the installation assembly 1, e. g. on the process side of the installation assembly 1, preferably within the first housing part 4, as depicted in FIG. 4. In this case the sensing element e. g. comprises a pressure gauge 14c. Alternatively, it could also be a pressure switch or pressure transducer. The modular sealing apparatus 2 in this embodiment does not comprise a spring 17 and is in accordance to that employed with FIGS. 1 and 2. If medium enters the at least one closed portion of the installation assembly 19 the pressure therein increases and starting from a certain threshold, this pressure increase will initiate a sealing mechanism. Note, that instead of a pressure gauge, pressure switch or pressure transducer also other types of sensor may be employed which are also subsumed under the present invention. In case of gaseous media e. g. also a gas detector may be a suitable sensing element.

Figure 5:
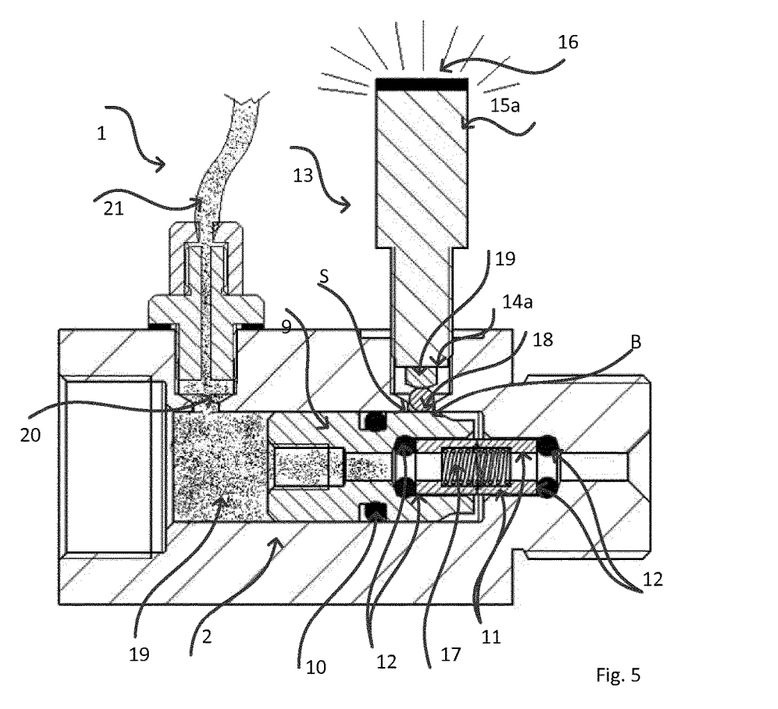
FIG. 5 shows a modular sealing apparatus with a failure detection unit in the form of a mechanical sensor and a connection port.

In FIG. 5 the installation assembly 1 according to FIG. 3a is shown again, but here, it includes a connection port 20 in the at least one closed portion 19 of the installation assembly 1, e. g. on the process side of the installation assembly 1, preferably within the first housing part 4. Via the connection port 20 the at least one closed portion of the installation assembly may be pressurized on purpose in order to perform a maintenance operation. For this, e. g. a purge line 21 may be used.

Figure 6:
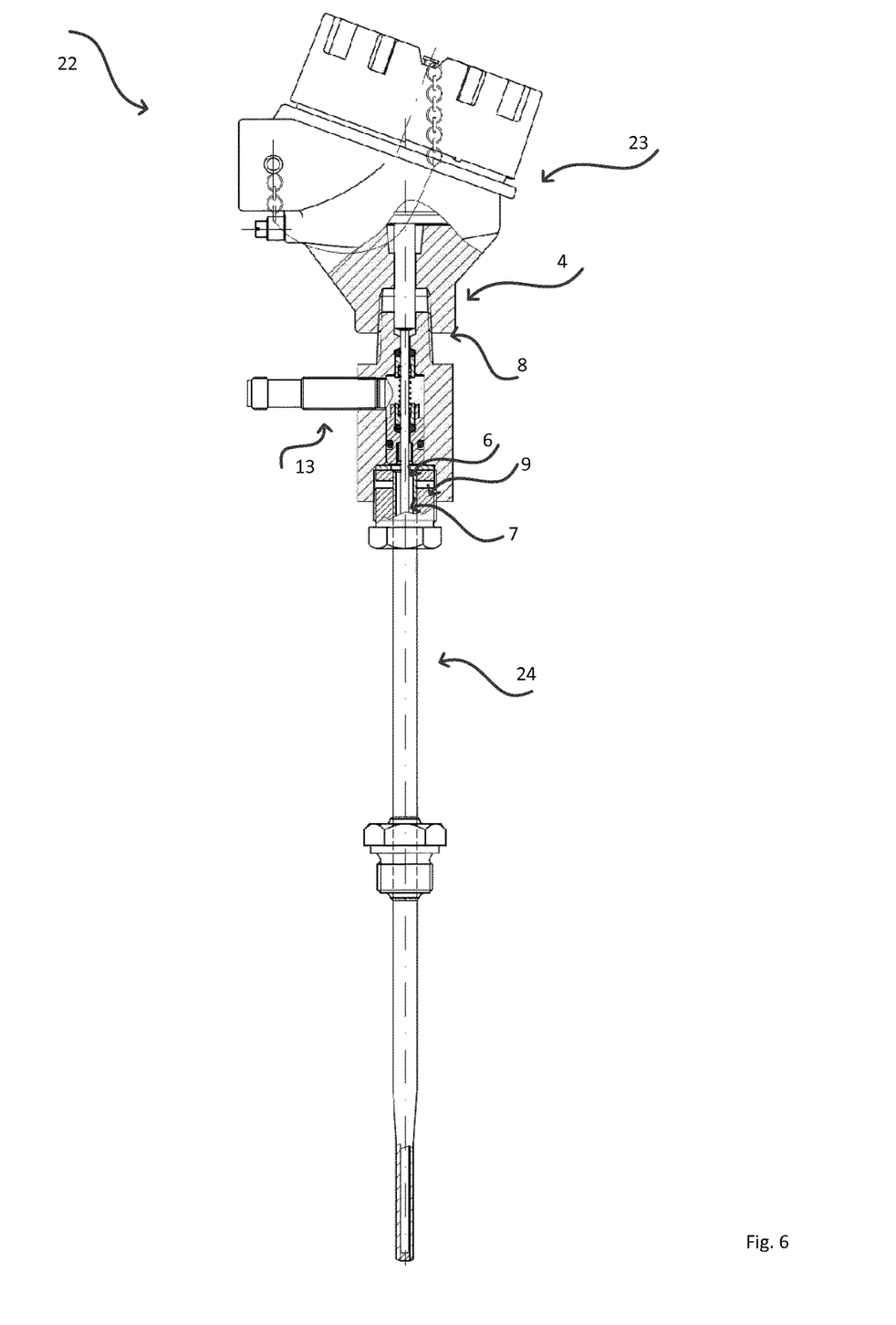
FIG. 6 shows an installation assembly in the form of a thermometer.

Finally, in FIG. 6 an embodiment of an entire installation assembly 22 in form of a thermometer is shown connected towards a measuring transducer 23 which serves for ascertaining the respective chemical and/or physical variable, here temperature. The installation assembly 22 has a first housing part 4, into which a modular sealing apparatus 1 is inserted via an opening or recess 8 of the first housing part 4. The modular sealing apparatus 1 in turn features a failure detection unit 13 according to one of the embodiments of the present invention. Note, that already explained features in connection with the modular sealing apparatus 1 or failure detection unit 13 are not explained in the context of FIG. 6, again. However, in FIG. 6, additionally a measuring insert 7 having an essentially elongated, rod shape is shown which can be introduced through a bore 66 proceeding at least through the first housing part 4 and through the modular sealing apparatus 1. Note that also more than one bore 6 and more than one measuring insert 7 may be provided. Finally, on the side of the installation assembly 2 facing the process, the measuring insert 7 is surrounded by means of a protective tube 24, e.g. a thermowell, which protects the at least one measuring insert 7 from the medium.

The invention claimed is:

1. A kit for assembling a modular sealing apparatus for an installation assembly, which installation assembly serves for accommodating a measuring insert extending into a process, the kit comprising:

a piston having a process side toward which the measuring insert extends and an access side opposite thereto;
a bushing;
a sealing element disposed on an end of the bushing adjacent the access side, wherein the piston and the bushing are embodied to be assemblable and to accommodate the measuring insert by a bore provided in the piston and in the bushing, and wherein the piston is interactively connected with the bushing such that, in a sealing event, a pressure on the process side of the piston transmitted by the piston to the bushing deforms the sealing element, thereby sealing the bore extending through the piston and the bushing about the measuring insert; and
a failure detection unit including at least one sensing element configured to detect a failure condition of the installation assembly, whereby leakage on the process side of the piston generates the pressure that initiates the sealing event on the access side, the failure detection unit further including electronics configured to convert the failure condition into a failure signal, wherein the at least one sensing element is configured to detect a movement and/or a change of the geometrical location of the piston such that the failure detection unit detects the initiation of the sealing event.

2. The kit of claim 1, wherein the kit is embodied to transmit the failure signal to a monitoring element or to a plant control system and/or to generate an alarm.

3. The kit of claim 1, further comprising at least two bushings and at least one spring, wherein the bushings and the spring are substantially aligned along an imaginary axis, and wherein the spring is disposed between the two bushings.

4. The kit of claim 1, wherein the failure signal is an electrical signal, a visual and/or an acoustic signal.

5. The kit of claim 1, wherein the sensing element includes a mechanical sensor.

6. The kit of claim 5, wherein the sensing element includes a mechanical micro-switch positioned in direct mechanical contact with a surface of the piston oriented perpendicular to a moving direction of the piston, wherein the micro-switch is activated by a translational sliding of the surface of the piston.

7. The kit of claim 5, wherein the sensing element includes a pivoted sphere, positioned in direct mechanical contact with a surface of the piston oriented perpendicular to a moving direction of the piston, and a mechanical micro-switch, which is activated by a rotation or translation of the sphere.

8. The kit of claim 1, wherein the sensing element includes an inductive sensor positioned to at least intermittently face a surface of the piston oriented parallel to a moving direction of the piston, wherein the piston includes an electrically conductive material.

9. The kit of claim 1, wherein the sensing element includes a capacitive sensor positioned to at least intermittently face a surface of the piston oriented parallel to a moving direction of the piston, wherein the piston includes an electrically conductive material.

10. The kit of claim 9, wherein the capacitive sensor includes a pressure sensor or a pressure switch.

11. The kit of claim 1, wherein the sensing element includes a magnetic sensor positioned to at least intermittently face a surface of the piston oriented parallel to a moving direction of the piston, wherein the piston at least partially includes of a magnetic material.

12. The kit of claim 1, wherein the sensing element includes an optical sensor positioned facing a surface of the piston oriented parallel to a moving direction of the piston.

13. The kit of claim 1, wherein the failure detection unit is arranged and/or embodied to detect a change of pressure in at least a closed portion of the installation assembly.

14. A modular sealing apparatus for an installation assembly, which installation assembly serves for accommodating a measuring insert extending into a process, the modular sealing apparatus comprising:
  a kit comprising:
    a piston having a process side toward which the measuring insert extends and an access side opposite thereto;
    a bushing;
    a sealing element disposed on an end of the bushing adjacent the access side, wherein the piston and the bushing are embodied to be assemblable and to accommodate the measuring insert by a bore provided in the piston and in the bushing, and wherein the piston is interactively connected with the bushing such that, in a sealing event, a pressure on the process side of the piston transmitted by the piston to the bushing deforms the sealing element, thereby sealing the bore extending through the piston and the bushing about the measuring insert; and
  a failure detection unit including at least one sensing element configured to detect a failure condition of the installation assembly, whereby leakage on the process side of the piston generates the pressure that initiates the sealing event on the access side, the failure detection unit further including electronics configured to convert the failure condition into a failure signal, wherein the at least one sensing element is configured to detect a movement and/or a change of the geometrical location of the piston such that the failure detection unit detects the initiation of the sealing event,
  wherein the kit is arranged to seal the bore liquid-tightly or gas-tightly.

15. An installation assembly comprising:
  a modular sealing apparatus comprising:
    a kit comprising:
      a piston having a process side toward which a measuring insert extends into a process and an access side opposite thereto;
      a bushing;
      a sealing element disposed on an end of the bushing adjacent the access side, wherein the piston and the bushing are embodied to be assemblable and to accommodate the measuring insert by a bore provided in the piston and in the bushing, and wherein the piston is interactively connected with the bushing such that, in a sealing event, a pressure on the process side of the piston transmitted by the piston to the bushing deforms the sealing element, thereby sealing the bore extending through the piston and the bushing about the measuring insert; and
      a failure detection unit including at least one sensing element configured to detect a failure condition of the installation assembly, whereby leakage on the process side of the piston generates the pressure that initiates the sealing event on the access side, the failure detection unit further including electronics configured to convert the failure condition into a failure signal, wherein the at least one sensing element is configured to detect a movement and/or a change of the geometrical location of the piston such that the failure detection unit detects the initiation of the sealing event,
    wherein the kit is arranged to seal the bore liquid- or gas-tightly; and
  a first housing part connectable to a process connection, wherein on a side of the first housing part facing the process connection, the sealing apparatus is insertable into an opening or recess of the first housing part.

16. The installation assembly of claim 15, further comprising a measuring transducer disposed on an end of the measuring insert, the measuring transducer configured to ascertain a chemical and/or physical variable, including a temperature.

17. The installation assembly of claim 15, further comprising a connection port in at least a closed portion of the installation assembly.

* * * * *